L. H. ATWELL.
COMBINED CASE AND POST FOR LAWN TENNIS NETS.
APPLICATION FILED JUNE 6, 1908.
906,848.
Patented Dec. 15, 1908.
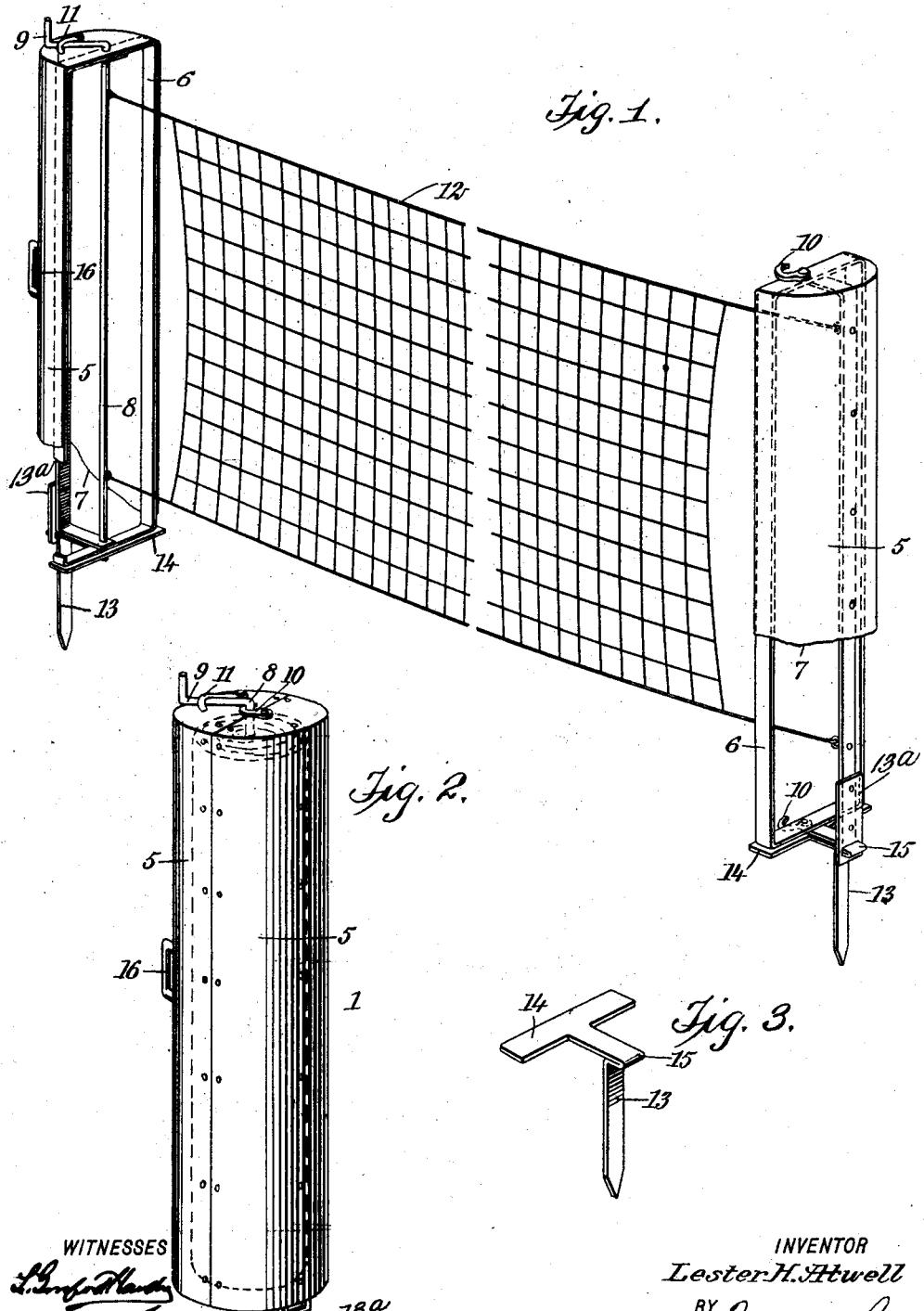

UNITED STATES PATENT OFFICE.

LESTER HORTEN ATWELL, OF GROVE CITY, PENNSYLVANIA.

COMBINED CASE AND POST FOR LAWN-TENNIS NETS.

No. 906,848.  Specification of Letters Patent.  Patented Dec. 15, 1908.

Application filed June 6, 1908. Serial No. 437,096.

*To all whom it may concern:*

Be it known that I, LESTER H. ATWELL, a citizen of the United States, and a resident of Grove City, in the county of Mercer and State of Pennsylvania, have invented a new and Improved Combined Case and Post for Lawn-Tennis Nets, of which the following is a full, clear, and exact description.

This invention has for its purpose the provision of means by which the net and posts in the game of lawn tennis are conveniently carried about, erected and removed. This I accomplish by the use of a sectional carrying case, each section of which is adapted to serve as a post for supporting the net when the latter is erected, and for containing the net when it is not in use.

The invention further contemplates a revoluble shaft or member journaled in one of said sections, on which the net is wound, and feet detachably connected to the sections of the case for securing them in fixed positions to the ground.

Reference is to be had to the accompanying drawings forming a part of this specification, in which similar characters of reference indicate corresponding parts in all the views.

Figure 1 is a perspective view, illustrating my improvements when the net is erected; Fig. 2 is a perspective view of the case when the net is rolled up and the two sections of the case assembled; and Fig. 3 is a perspective view of a foot which I preferably employ in securing each section of the case in a fixed position when using them as posts.

More specifically described, the invention comprises a case 1, of any desired form, longitudinally divided on an approximately central plane, forming it into two half sections 5, 5, each section of the case being composed of a frame 6 covered by a sheathing 7, all of which are constructed of any suitable material, such, for example, as metal.

In one of the sections of the case is journaled a longitudinal shaft 8 which is located near the center, and at one end is extended to the outside of the case, where it is provided with a crank 9. The opposite end of this shaft is also slightly extended beyond the case, as shown in Fig. 1, and the respective ends are adapted to be engaged by hooks 10 pivotally attached to the opposite ends of the other section of the case. The shaft is adapted to be locked against rotation by a hook or other equivalent device 11, which, as shown in Figs. 1 and 2, engages over the arm of the crank.

One end of the tennis net 12 is attached to the shaft 8, about which it is adapted to be wound, and the opposite end of the net is attached to the frame 6 of the other section of the case. Each section of the case I have shown to be provided near its bottom outer edge with a slotted plate $13^a$ for detachably connecting a foot 13 constructed as shown in Fig. 3, this foot in the particular embodiment of my invention illustrated being in the nature of a T-shaped spike with the upper portion bent approximately at right-angles upon itself to form a seat 14 on which the bottom of the case section is adapted to rest, and a projection 15 for passing through the slot in the projecting end of the plate, as shown in Fig. 1. This manner of constructing and assembling the feet with the case sections obviously renders the latter comparatively rigid when the net is stretched. The case I have shown provided with a handle 16 for carrying it about in the manner of an ordinary suit case.

In erecting the net, one section of the case is applied to one of the feet after the latter has been driven in the ground at one side of the court. The two sections of the case are then unlocked, as also the crank, and the unattached section carried to the opposite side of the court and applied to the other foot. During the separation of the case sections the net unwinds and hangs loose until it is placed under proper tension by turning the crank 9 to take up the slack, and is thus retained by engaging the hook 11. When removing the net the reverse operation is carried out. It is thus seen that I provide in a carrying case, the entire outfit for erecting and stretching the net for lawn tennis.

Having thus described my invention, I claim as new and desire to secure by Letters Patent:

1. The combination of a sectional carrying case, each section of which is provided with means adapting it to serve as a post, and a tennis net adapted to be contained within the case or stretched between the posts.

2. The combination of a carrying case divided longitudinally to form two separable sections, each section of which is adapted to serve as a post, and a tennis net having its opposite ends attached to said sections.

3. The combination of a sectional carrying case, each section of which is adapted to serve as a post, a shaft journaled in one of said sections, and a tennis net attached to the other section and to the shaft.

4. A sectional tennis net case, the sections of which are adapted to serve as posts, and a revoluble member journaled in one of said sections, on which the net is adapted to be wound.

5. The combination of a sectional carrying case, each section of which is provided with a detachable foot for securing it to the ground, and a tennis net attached at opposite ends to the sections of the case.

6. The combination of posts, each having a slot near its lower edge, a foot adapted to be forced into the ground, having an offset portion providing a seat at one side of the post and a projection for engaging in the slot at the opposite side of the post, and a tennis net supported on the posts.

7. The combination of a carrying case divided longitudinally to form two separable sections, each section having means for securing it in fixed position to the ground, and a revoluble member journaled in one of said sections.

8. The combination of a sectional carrying case, each section of which is provided with means for securing it to the ground, a revoluble member journaled in one section of the case, having an operating device at the outside thereof, and means for locking the member against rotation.

In testimony whereof I have signed my name to this specification in the presence of two subscribing witnesses.

LESTER HORTEN ATWELL.

Witnesses:
W. J. LEAMY,
FRED STOVER.